(12) United States Patent
Wable et al.

(10) Patent No.: US 9,390,184 B2
(45) Date of Patent: Jul. 12, 2016

(54) SEARCH AND RETRIEVAL OF OBJECTS IN A SOCIAL NETWORKING SYSTEM

(71) Applicant: Facebook, Inc., Willow Park, CA (US)

(72) Inventors: Akhil Wable, San Francisco, CA (US); Luke Andrew DeLorme, Menlo Park, CA (US); Wayne Kao, Mountain View, CA (US); Alexandre Roche, San Francisco, CA (US); Thomas Occhino, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/677,900

(22) Filed: Apr. 2, 2015

(65) Prior Publication Data

US 2015/0213141 A1    Jul. 30, 2015

Related U.S. Application Data

(63) Continuation of application No. 13/777,923, filed on Feb. 26, 2013, now Pat. No. 9,043,301, which is a continuation of application No. 13/554,869, filed on Jul. 20, 2012, now Pat. No. 8,407,200, which is a continuation of application No. 12/816,377, filed on Jun. 15, 2010, now Pat. No. 8,239,364.

(60) Provisional application No. 61/267,777, filed on Dec. 8, 2009.

(51) Int. Cl.
G06F 17/30 (2006.01)

(52) U.S. Cl.
CPC ...... *G06F 17/30867* (2013.01); *G06F 17/3087* (2013.01); *G06F 17/30554* (2013.01)

(58) Field of Classification Search
CPC .......................... G06F 17/30; G06F 17/30867
USPC .................................................. 707/600–899
See application file for complete search history.

(56) References Cited

U.S. PATENT DOCUMENTS

| | | | |
|---|---|---|---|
| 7,860,889 B1 | 12/2010 | Martino et al. | |
| 8,549,072 B2 | 10/2013 | Zhu et al. | |
| 8,799,068 B2 | 8/2014 | Kendall et al. | |
| 2003/0041147 A1* | 2/2003 | van den Oord et al. | G06F 17/276 709/227 |

(Continued)

OTHER PUBLICATIONS

United States Office Action, U.S. Appl. No. 13/777,923, Sep. 24, 2014, eight pages.
United States Office Action, U.S. Appl. No. 13/554,869, Oct. 22, 2012, eight pages.

(Continued)

*Primary Examiner* — Isaac M Woo
(74) *Attorney, Agent, or Firm* — Fenwick & West LLP

(57) ABSTRACT

A social networking system receives a query associated with a user and, in response, provides a combined result set comprising objects stored by a social networking system that match the query. The combined result set comprises multiple result sets obtained from different search algorithms. The various objects stored by the social networking system may be of different types representing different concepts, such as user objects, application objects, event objects, location objects, group objects, and hub/page objects, any of which may be included in the result set. The objects of the result set may be further filtered, ordered, and/or grouped based at least in part on known relationships of the user with the objects, such as geographic distances between locations associated with the user and the objects.

20 Claims, 6 Drawing Sheets

(56) References Cited

U.S. PATENT DOCUMENTS

2008/0270158 A1 10/2008 Abhyanker
2009/0306996 A1 12/2009 Tsaparas et al.
2010/0132049 A1 5/2010 Vernal et al.
2010/0318571 A1 12/2010 Pearlman et al.
2011/0022621 A1 1/2011 Luo et al.

OTHER PUBLICATIONS

United States Office Action, U.S. Appl. No. 12/816,375, Mar. 21, 2012, nine pages.
United States Office Action, U.S. Appl. No. 12/816,377, Mar. 20, 2012, nine pages.

* cited by examiner

| 501 | |
|---|---|
| Name Token | User ID |
| "Adams" | 1 |
| "Charles" | 6 |
| "Charlotte" | 7 |
| "David" | 3 |
| "Duprey" | 2 |
| "Elias" | 16 |
| "Eliot" | 3 |
| "Francis" | 2 |
| "John" | 1 |
| "John" | 5 |
| "Penoyer" | 4 |
| "Penoyer" | 7 |
| "Richard" | 4 |
| "Smith" | 5 |
| "Tesla" | 16 |
| "Williams" | 6 |

Christian Konig: 0

| 502 | |
|---|---|
| Name Token | User ID |
| "Alice" | 13 |
| "Christian" | 0 |
| "Clive" | 15 |
| "Eliot" | 8 |
| "Eliot" | 9 |
| "Eliot" | 11 |
| "George" | 14 |
| "John" | 12 |
| "Harmon" | 12 |
| "Konig" | 0 |
| "Lewis" | 15 |
| "Liddell" | 13 |
| "MacDonald" | 14 |
| "Nadine" | 11 |
| "Pleasance" | 13 |
| "Sally" | 9 |
| "Staples" | 15 |
| "Stearns" | 8 |
| "Thomas" | 8 |

David Eliot: 3

| 503 | |
|---|---|
| Name Token | User ID |
| "Adams" | 1 |
| "Alice" | 13 |
| "Charles" | 6 |
| "Clive" | 15 |
| "David" | 3 |
| "Eliot" | 3 |
| "George" | 18 |
| "Gordon" | 18 |
| "John" | 1 |
| "John" | 17 |
| "Keats" | 17 |
| "Lewis" | 15 |
| "Liddell" | 13 |
| "Pleasance" | 13 |
| "Staples" | 15 |
| "Williams" | 6 |

Thomas Stearns Eliot: 8

FIG. 5

SEARCH AND RETRIEVAL OF OBJECTS IN A SOCIAL NETWORKING SYSTEM

CROSS REFERENCE TO RELATED APPLICATIONS

The application is a continuation of application Ser. No. 13/777,923, filed on Feb. 26, 2013, which is in turn a continuation of application Ser. No. 13/554,869, filed on Jul. 20, 2012, which is in turn a continuation of application Ser. No. 12/816,377, filed on Jun. 15, 2010, which in turn claims the benefit of Provisional Application No. 61/267,777, filed on Dec. 8, 2009. These applications are incorporated herein by reference.

BACKGROUND

The present invention generally relates to the field of computer data storage and retrieval, and more specifically, to performing searches for objects within a social networking system.

Modern computing systems store vast amounts of data, and as a consequence it has become increasingly important to provide users with effective ways to locate information that is relevant to their interests. One area in which large amounts of information are involved is social networking Social networking systems allow users to designate other users as friends (or otherwise connect to or form relationships with other users), contribute and interact with media items, use applications, join groups, list and confirm attendance at events, create pages, and perform other tasks that facilitate social interaction. Since each of these tasks may involve various data objects, social networking systems are a good example of the demand for systems that help users locate relevant information from within a large set of information tracked or otherwise used by the system.

Although it might be helpful to customize a search for a user's particular needs, many systems have little or no relevant information about the user who is searching for information, which makes locating information of particular relevance to a given user more challenging. But a social networking system typically tracks a considerable amount of information about each user, which can be leveraged to identify items of relevance to a given user. However, the query functionalities currently available on social networking systems do not fully leverage the information that the systems store. Nor do other systems use the information stored by social networking systems to improve the relevance of the data provided to their own users.

SUMMARY

Embodiments of the invention improve the ability of users of a social networking system to search for information that is likely to be relevant to them by leveraging the social information about those users. In one embodiment, a social networking system receives a query, such as a textual query, from a client via a client device. In response to the query, the social networking system produces a result set of objects stored by the social networking system and that match the query.

The various objects stored by the social networking system may include user objects, application objects, event objects, group objects, web page objects, location objects, hub/page objects, and/or any of a variety of types of objects that may be tracked or maintained by the social networking system. The combined result set may combine objects of one or more of the different types stored by the system that match the user's query. The entry of a query thus provides the user with a single search interface for obtaining any objects in the social networking system. The user can then interact with these objects according to the functionality provided by the social networking system for their various object types. For example, a message can be sent to the user corresponding to a user object of the result set, a group corresponding to a group object can be joined, and the like.

In one embodiment, the social networking system represents the objects in a social graph—that is, as a set of nodes connected by edges, each node corresponding to an object. The edges between the nodes represent relationships between the objects, such as actions taken by one object on another object.

In one embodiment, the social networking system performs a plurality of search algorithms using the query. The search algorithms may include, for example, a search of objects that have a certain degree of relationship with the user providing the query, such as being friends-of-friends. The search algorithms may also include a search of objects in a history of the user providing the query, such as recently viewed objects. The search algorithms may further include a search of objects determined to be globally important across the social networking system as a whole. The results for each of the search algorithms are aggregated into a combined result set and then presented to the user. In one embodiment, the objects of the combined result set are filtered, ordered, and/or grouped based at least in part on known relationships of the user providing the query with the objects—such as a friendship relationship with a user object, a number of friends in common with a user object, prior uses of an application object, membership of an event object, and the like—or a measure of an affinity of the user for the object, such as a geographic distance between locations associated with the user and the object, a graph distance in the social graph between the user and the object, and a similarity measure between the user and the object.

In one embodiment, one or more of the search algorithms perform a prefix search in which the search matches objects with name tokens, such as a first or last name associated with a user object, for which the query is a prefix. The prefix search may be performed again for each new character that the user enters into a search interface, such that the combined result set may contain fewer matching objects. For example, when the user types additional characters into the search interface, fewer objects may match the (now longer) typed query, and hence the combined result set would include fewer objects.

In one embodiment, the search algorithms include a search of second-order connections of the searching user who provided the query, such that the second-order connections match the query. The second-order connections of the searching user are those objects in the social graph with two edges separating them from a user object corresponding to the searching user—i.e., the first-order connections of the first-order connections of the searching user. In one embodiment, the social networking system stores a connection index comprising a set of connection tables, each connection table corresponding to one of the users of the social networking system and indicating the connections of that user. In response to a query of the searching user, the first-order connections of the searching user—such as the searching user's direct friends—are determined. Then, based at least in part on the connection tables corresponding to the first-order connections, second-order connections are identified and a number of connections in common with the searching user are identified for each second-order connection. The number of connections in common may be used to order the second-order connections in a search result. In one embodiment, each connection table stores a set of name tokens, such as first and/or last names of user objects, sorted to allow rapid prefix searching of the name tokens for the query.

BRIEF DESCRIPTION OF DRAWINGS

FIG. 5 illustrates example tables of a connection index used to obtain second-order connections, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
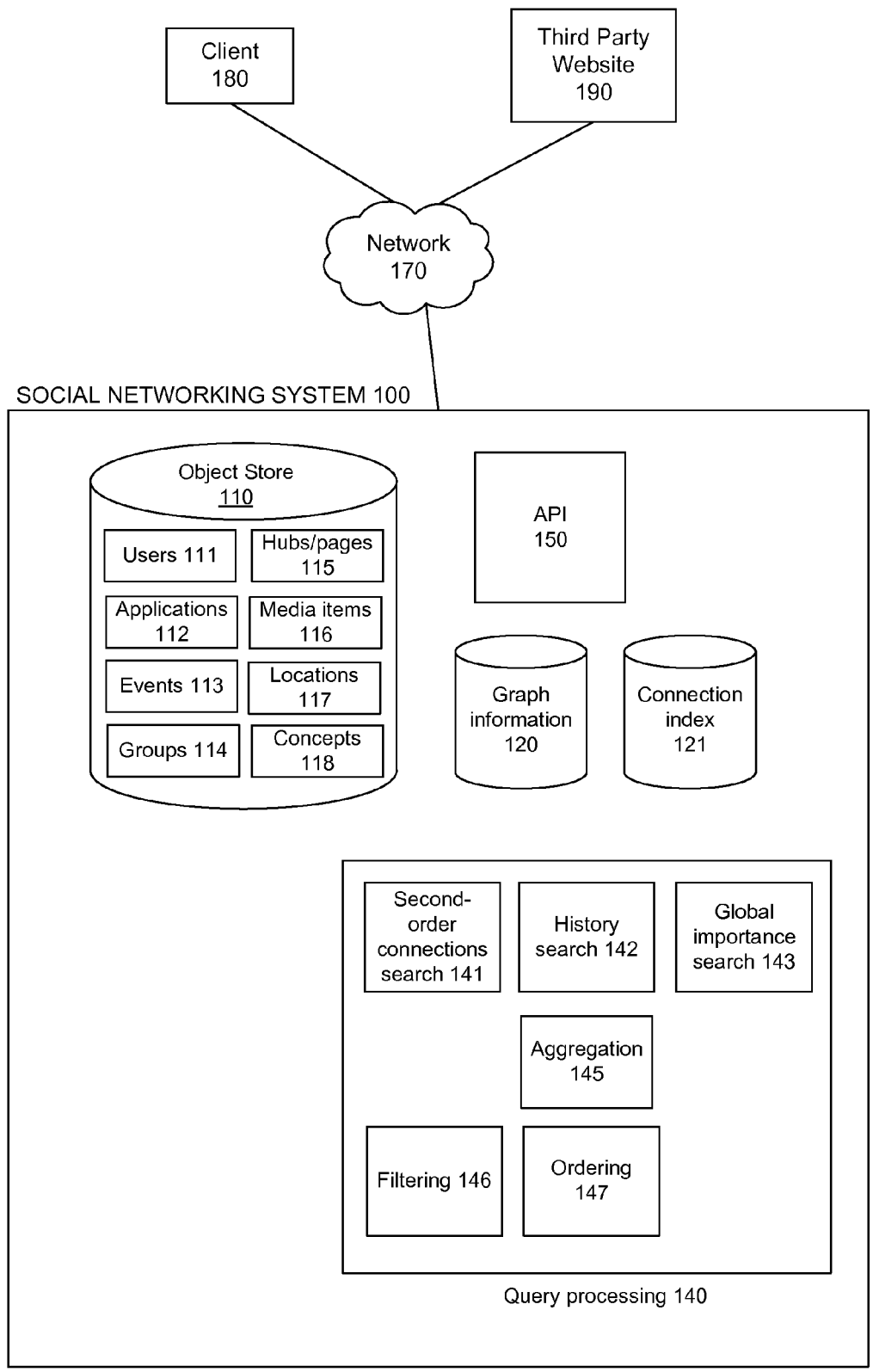
FIG. 1 is a high-level block diagram of a computing environment, according to one embodiment.

FIG. 1 is a high-level block diagram of a computing environment according to one embodiment. FIG. 1 illustrates a social networking system 100, a client device 180, and a third party website 190 connected by a network 170. A user of the client device 180 interacts with the social networking system 100 via an application such as a web browser, performing operations such as browsing content, posting messages, performing queries for people or other content of interest, and the like. Additionally, the third party website 190 can also interact with the social networking system 100 via a system-provided application programming interface (API) 150. For example, the third party website can perform operations supported by the API, such as performing queries to obtain information stored by the social networking system 100.

The social networking system 100 comprises a number of components used to store information on objects represented in or by the social networking environment, and on the relationships of the objects. The social networking system 100 additionally comprises components to enable clients of the system—such as a human user of the client device 180 interactively using the system, or a component of the third party website 190 requesting information—to query the system for information of interest.

More specifically, the social networking system 100 comprises an object store 110 that stores information on various objects tracked by the social networking system 100. These objects may represent a variety of things with which a user may interact in the social networking system 100, including, without limitation, other users 111 of the social networking system (represented, e.g., as a profile object for the user), applications 112 (e.g., a game playable within the social networking system), events 113 (e.g., a concert that users may attend), groups 114 to which users may belong, pages or hubs 115 (e.g., pages constituting a particular organization's presence on the system), items of media 116 (e.g., pictures, videos, audio, text, or any other type of media content), locations 117 associated with a user (e.g., "Santa Clara, Calif., USA"), and even concepts 118 or other terms (e.g., "Victorian literature"). The object store 110 may further store objects representing other data routinely produced by users of the social networking system 100, such as inbox messages, status updates, photos, videos, comments, notes, and postings. An object in the object store 110 may represent an entity existing within the social networking system (e.g., an application 112 available on the social networking system), a virtual entity that exists outside the domain of the social networking system (e.g., a website), or a real-world entity (e.g., a sports team or a retail store).

The object store 110 may store all of the objects existing within the social networking system 100, such as the code of an application 112, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "Charles Williams" for a person, "Birthday Reminder" for an application, or "Penguin Fanciers" for a group), an image representing the object (e.g., a user profile picture), or one or more tags assigned to the object by users (e.g. the textual strings "game", "crime", and "strategy" for a strategy game application). Different types of objects may have different types of metadata, such as a set of associated users 111 for a group 114, a media type (e.g., "video") for a media item object 116, and a unique user ID and name tokens (e.g., separate first and last names "Charles" and "Williams") for a user object 111.

In one embodiment, the social networking system 100 further comprises a graph information store 120 that represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects representing that the users are have a relationship in the social networking system (e.g., are friends, or have communicated, viewed the other's profile, or interacted in some way), an edge between a user object and an application object representing that the user has used the application, an edge between a user object and a group object representing that the user belongs to the group, and an edge between a user object and a page object representing that the user has viewed the page, to name just a few. For example, if one user establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" as the label between two user objects), or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

In one embodiment, the social networking system 100 adds information to the graph information store 120 in real time as it observes events taking place indicating relationships between the various objects, such as a user 111 interacting with an application 112. Alternatively and/or additionally, the graph information store 120 may be created based on existing stored information from which relationships can be inferred. For example, the friend list of a user 111 might indicate that the user has a friend relationship with another user, or the data for a group 114 might indicate that some set of users has a membership relationship with that group, and this information could be reflected in the graph information store 120.

U.S. application Ser. No. 12/193,702, filed Aug. 18, 2008, which is incorporated by reference in its entirety, describes an example of a social networking system that maintains data for a number of different types of objects used by the social networking system. U.S. application Ser. No. 12/485,856, filed Jun. 16, 2009, which is incorporated by reference in its entirety, describes embodiments of a social networking system that maintains objects and connections among the objects in a social graph.

In one embodiment, the social networking system comprises a connection index 121 that stores a subset of the information in the graph information store 120 in a manner that allows rapid queries of that information. For example, in one embodiment the connection index 121 stores, for each user, a list of all of the connections between that user and other users. This allows, for example, a rapid determination of other users to whom the user has a direct or indirect connection (e.g., friends-of-friends) and the order of their connection (e.g., 2, for friends-of-friends). The use of the connection index 121 is discussed further below with respect to FIGS. 4-5.

The social networking system 100 further comprises a query processing module 140 that identifies objects from the object store 110 that match a particular search query. In one embodiment, the searching user directly provides a textual query by typing text into a text area associated with query functionality of a user interface. In other embodiments the user provides a non-textual query that is translated to a textual query, such as selecting a list item with associated text that serves as the search query text. The search query can be issued in a user-specific query context, such as when a searching user has logged in to the social networking system 100 either from a web site of the social networking system or from the third party website 190 that accesses data of the social networking system. In a user-specific context, the social networking system 100 can leverage the information that it stores about the searching user and about the various objects in the object store 110 to predict one or more objects that are likely to be of interest to the query user, given the search query or a portion thereof.

The query processing module 140 contains a number of sub-modules 141-143 that identify objects according to different search algorithms, an aggregation sub-module 145 that combines the results from the various sub-modules, and filtering and ordering sub-modules 146 and 147 that modify the contents and/or order of the combined results. These various sub-components of the query processing module 140 are now described in more detail.

The second-order connections search sub-module 141 identifies first-order and second-order user connections of the searching user that match the query. Specifically, the second-order connections search sub-module 141 identifies a set comprising the first-order connections of the searching user having object types of interest, such as user objects 111 and page objects 115. The second-order connections search sub-module 141 then further identifies a set of all the first-order connections of the objects within the identified set (other than the searching user itself), this latter set of connections constituting the second-order connections of the searching user. Finally, the second-order connections search sub-module 141 produces, as its result set, all of the identified first-order and second-order connections that match the query according to some query matching algorithm, such as a prefix substring match. In one embodiment, the second-order connections search sub-module 141 performs a separate search, and produces a separate result set, for each of the types of interest, such as one search and result for user objects 111, one for page objects 115, and the like. Alternatively, the second-order connections search sub-module 141 may return a single result set containing both the first-order and second-order connections, or it may return a separate result set for each.

It is appreciated that although the second-order connections search sub-module 141 has been described as returning first- and second-order connections, any number of orders of connection could be returned. For example, the sub-module could also return connections of third order, in addition to those of first and second order.

In one embodiment, in order to decrease the time needed for the search, the second-order connections search sub-module 141 performs the search with reference to the connection index 121. This use of the connection index 121 is described in more detail with respect to FIGS. 4-5, below.

The history search sub-module 142 identifies, among objects stored in the history of the searching user, objects that match the query. In one embodiment the history for the search user is not stored within the social networking system 100 itself, but rather is cached on the client device 180 of the particular searching user 111 to whom it pertains. That is, as a particular searching user represented by a user 111 in the object store uses his or her client device 180 to communicate with other users 111, to use applications 112, and the like, the corresponding objects are cached on the client device. Similarly, portions of the connection index 121, such as first-order user connections of the searching user, can likewise be cached on the client device 180. Regardless of the exact storage location of the history for the searching user, the history search sub-module 142 examines each of the objects within the history and identifies those matching the query, according to some match algorithm.

The global importance search sub-module 143 identifies, among objects considered to be of global importance, objects that match the query. The globally important objects need not have any specific relationship with the searching user, but rather are considered to be of general interest across users of the social networking system 100 as a whole. The objects to be placed within the globally important group 131C may be identified in different ways. For example, objects may be considered to be globally important if they have been accessed (e.g., viewed), tagged, posted, marked as having one or more fans, or otherwise designated as being of interest, some pre-specified number of times. Alternatively, actions such as accessing/tagging/posting may be used to calculate a score, and the objects with the top N scores may be selected as globally important objects, for some integer N. In one embodiment, the globally important objects, or references thereto, are stored in a distinct portion of the object store 110 so that they are readily available for searches by the global importance search sub-module 143. The global importance search sub-module 143 then selects as its result set, from among the objects of global importance, those objects that match the query according to some match algorithm.

In one embodiment, the match algorithm used by one or more of the sub-modules 141-143 is a case-insensitive prefix search that compares the query with prefixes of various portions of the metadata, such as the first name, last name, and/or nickname of a user object 111, a title of an application object 112, and the like. The match algorithm, or another component of the social networking system 100, may additionally process the query text and/or the metadata of the various objects prior to performing the match in order to allow provide greater flexibility in the matching. For example, the query processing module 140 could take into account that the first name "Mike" is a well-known alternative for the first name "Michael," such that typing "Michael" would match "Mike", as well, even though "Mike" does not contain the prefix "Michael." In some embodiments, the match algorithm additionally compares the query to data other than object names, such as words in tags assigned to objects, or synonyms of such words.

The aggregation sub-module 145 receives the result sets produced by each of the search sub-modules 141-143 and aggregates them into a single combined result set to be presented to the user. The aggregation module 145 removes duplicates of objects that occur multiple times across the various result sets, such as a user object 111 that occurs in the result sets for the second-order connections search sub-module 141 and for the history search 142.

In one embodiment, the filtering sub-module 146 filters the combined result set based on an affinity measure of the searching user for each of the objects. In different embodiments, the affinity measure is a function of one or more of a physical distance (e.g., a residence location of a user object in the matching set must be within N miles of a residence location of the searching user), a graph distance between the user object 111 of the searching user and objects of the matching set on the social graph (e.g., the distance must be 2 or less), and a similarity measure.

The similarity measure quantifies how likely the searching user would be to find a particular matching object to be of interest, and may be calculated in different ways in different embodiments. For example, the similarity measure may be calculated by comparing a user profile of the searching user to the matching object, such as by noting that the user profile states that the searching user enjoys golf and that the matching object is a group 114 devoted to golf. Alternately and/or additionally, the similarity measure may be calculated by determining interests of the searching user based on past actions of the searching user within the social networking system, such as posting messages related to golf or using golf game applications 112, and comparing the determined interests to information about the matching object. The physical distance, graph distance, and the similarity measure can be considered, individually or collectively, to constitute an "affinity" of the searching user for the object in question.

The filtering module 146 may further filter the matching objects based on additional criteria. For example, when the query processing module 140 is matching objects on behalf of a third party website 190 that rents movies, it could filter the identified objects to include only those objects having the keyword "movie" (or synonyms such as "film"), within their metadata, for example. Embodiments may use any of a variety of criteria for filtering the search results based on contextual information about the system in which the search interface is presented to the user.

In one embodiment, the ordering module 147 further imposes an ordering on the initial and/or filtered matching objects of the combined result set. The order may be based on the affinity measure discussed above, e.g., with geographically closer objects ordered higher than geographically farther objects. Other factors may additionally and/or alternatively be taken into consideration when determining the order, such as the search sub-module 141-143 from which an object came, e.g., user-specific objects returned by the history search sub-module 142 tending to be ordered more highly than those in the non-user-specific globally important group 131C.

Additionally, the query ordering module 147 can divide the matching objects into groups and order each group separately, each group having its own ordering criteria. The groups may correspond to the various result sets provided by the search sub-modules 141-143, or the groups may be defined in other ways. For example, user objects 111 from the result set provided by the second-order connections search module 141 may be displayed in a "friends" group separate from objects of other groups and ordered according to the graph distance of the various friends. Further, first-degree friends (friends with graph distance 1) may be placed into a separate sub-group ordered according to geographic distance of the friends, and second-degree friends may be placed into a sub-group ordered according to a number of mutual friends.

In one embodiment, the filtering and/or ordering operations may be performed by the search sub-modules 141-143, rather than by (or in addition to) the filtering and ordering modules 146-147. For example, the second-order connections search sub-module 141 can group the first-order and second-order connections and order the second-order connections according to numbers of mutual connections.

The query processing module 140 may select the information about the objects that are returned in the combined result set, such as selecting associated metadata such as object names or profile pictures, the actual content data associated with the object (e.g., the video data of a video media item), or some combination of the two.

The operations of the various query processing sub-modules 141-147 need not be static, but may be determined in a dynamic manner based on options provided along with the query. That is, the objects that are returned in the various result sets, their various groupings and order, the filtering criteria that are application to them, the associated information that is provided on them, and the like, may all be specified dynamically based on options provided along with the query. For example, the query might include not only the query text itself (e.g., the string "Eli" in the example above), but also an option specifying that only objects from the result sets provided by the second order connections search sub-module 141 and the global importance search sub-module 143 should be included, and an option specifying that the users from the second order connections search sub-module should be grouped with first-order connections preceding second-order connections, where the former is ordered according to geographic proximity and the latter is ordered according to number of mutual connections, for example. In one embodiment, the options may be specified by the user, either directly, or indirectly based on pre-specified user preference settings.

As described above, the social networking system 100 provides the search functionality to its users within the system 100. In other embodiments, however, the social networking system 100 may export this search capability to third-party systems, thereby expanding aspects of the social networking environment outside of the actual social networking system 100. For example, the social networking system 100 may comprise an application programming interface (API) 150 used to access information stored by the social networking system, such as the various objects of the object store 110. For example, the functionality of the query processing module 140 can be exposed to other applications via the API 150. In one embodiment, the API can be accessed both locally and remotely. For example, the API 150 may be accessed via a locally-loaded module, such as a DLL, or it may be may be accessed remotely as a web service by a third party website 190 or other remote system. Embodiments describing use of a social networking system's functionalities by systems outside of the social networking system are described in U.S. application Ser. No. 12/324,761, filed Nov. 26, 2008, and U.S. application Ser. No. 12/508,521, filed Jul. 23, 2009, both of which are incorporated by reference in their entireties.

Use with Example User Interfaces

Figure 2A:
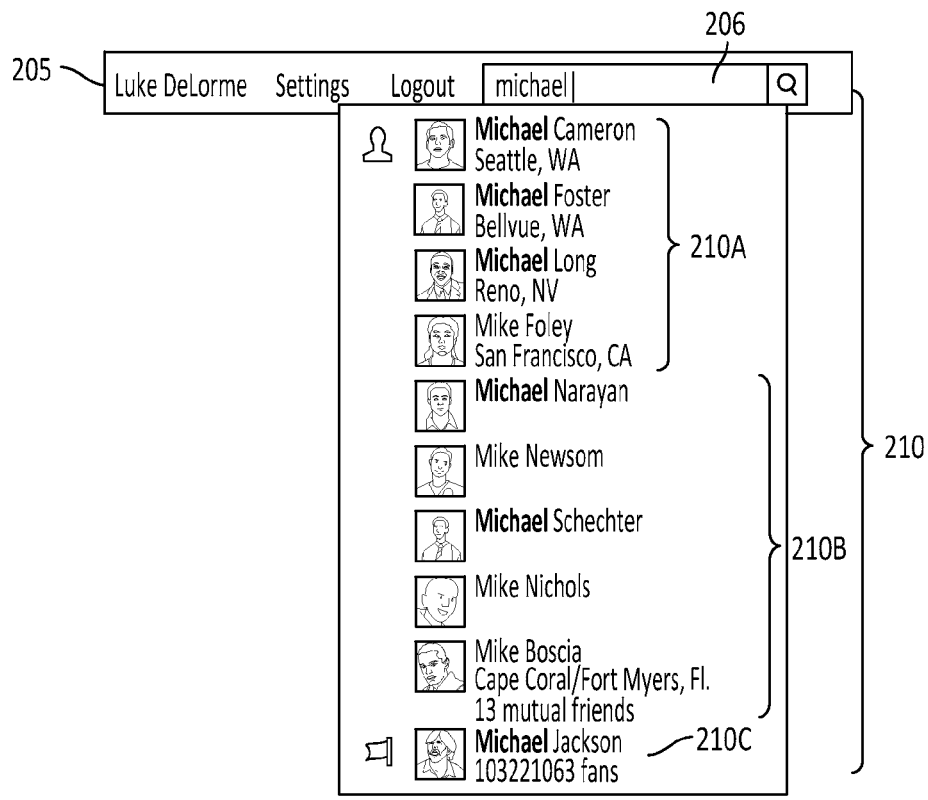
FIG. 2A illustrates a query entered by a user in a search interface of a social networking system, according to one embodiment.
Figure 2B:
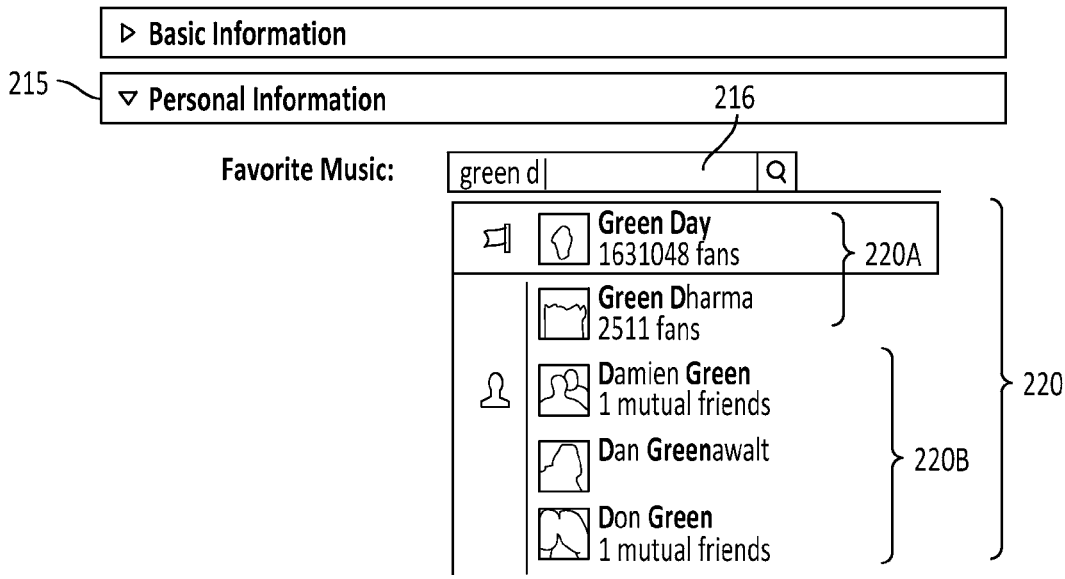
FIG. 2B illustrates a query entered by a user in a user interface of the social networking system, according to one embodiment.
Figure 2C:
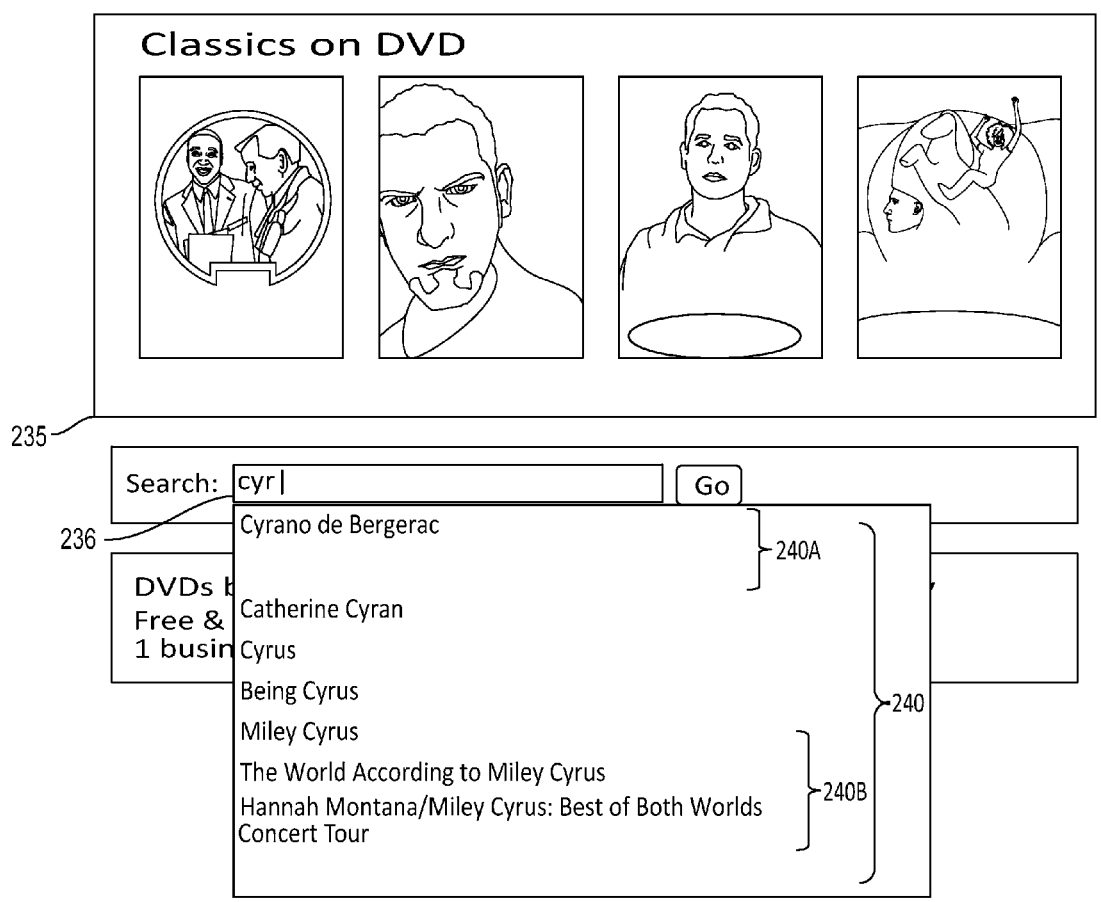
FIG. 2C illustrates use of a query entered by a user in a user interface of a third party website separate from the social networking system, according to one embodiment.

FIGS. 2A-2C are screenshots illustrating different search contexts and displays of search results using the query functionality of the query processing module 140, according to one embodiment.

FIG. 2A illustrates a query entered by a user in a search interface of the social networking system 100. Specifically, FIG. 2A depicts a search bar 205 comprising a search query area 206 into which a user can enter a textual query string and receive a set of matching objects 210. In the example of FIG. 2A, the searching user has entered the query "michael", presumably searching for users 111 of that name. In response, the set of matching objects 210 is displayed, the matching objects all having the prefix "michael," (or "mike," a known equivalent thereof).

In the example of FIG. 2A, the matching objects 210 are displayed in groups, according to their type and/or relevance to the user who specified the query. For example, the first nine objects are users 111 that are first-order or second-order connections of the searching user and are found by performing a prefix search of the connection index 121. Of these nine users, four are in a sub-group of first-order connections 210A, and the remaining five are in a sub-group of second-order connections 210B. Each user 111 is displayed based on its degree of relationship with the searching user, with first-order connections displaying their addresses, and second-order connections displaying how many mutual friends they have in common with the searching user. The last of the matching objects 210, an object 210C for a page 115 dedicated to Michael Jackson, is not of specific relevance to the searching user—e.g., is not a first-order or second-order connection of the user—but is considered of global importance given its sheer aggregate popularity.

Within each group, the order of the various matching objects 210 can be determined based on the relevance of the object to the searching user, as calculated from the information on the searching user tracked by the social networking system 100. For example, as previously noted, the matching first- or second-order connections of FIG. 2A are ordered based on their degree of relationship, with the first-order connections displayed before the second-order connections. Further, FIG. 2A depicts another potential ordering based at least in part on a geographic proximity to the searching user. For example, for a searching user known to be from the state of Washington, the first-degree friends 210A are ordered such that friends also located in Washington precede those from other states, such as Nevada or California. Additionally, the second-order connections 210B are ordered based on their number of mutual connections in common with the searching user, with second-order connections with more mutual connections located higher in the result set.

FIG. 2B illustrates a query entered by a user in a user interface of the social networking system 100. More specifically, FIG. 2B depicts a portion 215 of a user profile listing the user's personal information, including a text field 216 for entering text specifying the user's favorite music. In a conventional user interface, the user would be obliged to enter the entire text string corresponding to the user's favorite music, but in the interface of FIG. 2B the social networking system 100 performs an implicit query as each character of the string is typed. In the depicted example, the user has typed the string "green d", and in response the page objects 220A with names "Green Day" and "Green Dharma" have been displayed, along with second-order connections 220B. If the user typed an additional character, such as 'h' (thereby forming the query string "green dh"), the query processing module 140 might narrow the search results 220 to contain only the page object for "Green Dharma."

Note that the page objects 220A have been ordered above the second-order connections 220B, with the page objects further ordered based on number of fans (popularity), as is appropriate for a profile field in which the user is more likely to specify a concept or a group (e.g., a band or a musical genre) rather than an individual person. This ordering of groups 114 before users 111—or the ordering of the users before groups in FIG. 2A—could be specified, along with other rules, as part of the call to the API 150 through which the query processing module 140 is accessed. For example, scripting code within the web pages embodying the user interfaces of FIGS. 2A and 2B could call the API 150, specifying the rules by which the query results are to be ordered as parameters of the call. This permits different user interfaces to order the results in different ways appropriate to the context in which they are used. Similarly, API-specified rules could permit the exclusion of certain types or classes of objects, as appropriate for the context in which the objects are being matched. For example, when suggesting profile values for favorite music, as in the example of FIG. 2B, the social networking system 100 could specify that objects for groups 114, hubs/pages 115, media items 116, and concepts 118 should be included as matching objects, but that objects for users 111, applications 112, events 113, and locations 117 should be excluded on the assumption that they are unlikely to represent a preferred type of music or a particular preferred artist.

The query need not be specified within a user interface of the social networking system 100 itself. Rather, a third party website or other system may use an application programming interface (API) of the social networking system 100 to gain access to the information stored by the social networking system, thereby enhancing the information that the third party website provides. FIG. 2C illustrates use of a query entered by a user in a user interface of a third party website 190 separate from the social networking system 100, according to one embodiment. More specifically, FIG. 2C represents a portion 235 of a web-based user interface of a movie rental website 190, the website leveraging the information provided by the social networking system 100 to provide useful movie suggestions 240, such as suggestions tailored to a particular user.

In FIG. 2C, a user has entered the string "cyr" into a textual search field 236. In response, the third party website 190 has called the API 150 of the social networking system 100, e.g., using a web service interface, has received a number of objects from the query processing module 140, and has displayed a number of suggestions 240 based on the received objects. As described above with respect to FIG. 2B, parameters can be provided along with the query that specify what types of objects will be matched, how many objects will be matched, how the objects will be ordered in the matching set, and the like. The third party website 190 can present this information directly—i.e., showing each matching object in the same order as it was provided—or indirectly—e.g., showing a set of items derived from the objects.

As an example of indirect use of the matching objects, the set of objects matching the query "cyr" might include a user object 111 for a first-order user connection of the user named Slobodan Cyrcic and obtained from the result set of the second-order connections search sub-module 141, a hub/page object 115 about the play/film "Cyrano de Bergerac" obtained from the result set from the history search sub-module 142, and a group object 114 about the actress Miley Cyrus obtained from the globally important group 131C in the query group store. The movie rental website 190 could then determine that it had various titles related to the hub/page object "Cyrano de Bergerac," including the film "Cyrano de Bergerac" and the compilation "Cyrano de Bergerac/The Son of Monte Cristo," and various titles and/or categories related to the group object 114 devoted to Miley Cyrus, including the DVD "The World According to Miley Cyrus" and a "Hannah Montana tour" DVD. Additionally, the movie rental website 190 could list other titles or categories not derived from one of the matched objects, such as DVDs for the films "Cyrus" and "Being Cyrus" and search results for the actress Catherine Cyran, as found in its own inventory databases.

The third party website 190 could also use additional information stored by the social networking system 100 to provide better suggestions 240. For example, the third party website 190 could additionally obtain information from the query user's profile via the API 150 and analyze it to determine that the searching user is (for example) a middle-aged fan of foreign films. The website 190 could accordingly order the suggestions 240 so that those related to the foreign film "Cyrano de Bergerac" are placed high in the list, and those related to the youth-oriented Miley Cyrus items are placed low in the list.

Even if the searching user had not identified himself or herself by logging in or otherwise authorizing the third party website 190 to access the user's information on the social networking service 100, the third party website could still obtain non-user-specific information useful for formulating suggestions 240. For example, the third party website 190 would still have access to objects such as those provided by the global importance search sub-module 143, even if it lacked access to the user-specific objects provided by the second-order connections search 141 and the history search 142.

Process of Object Search and Retrieval

Figure 3:
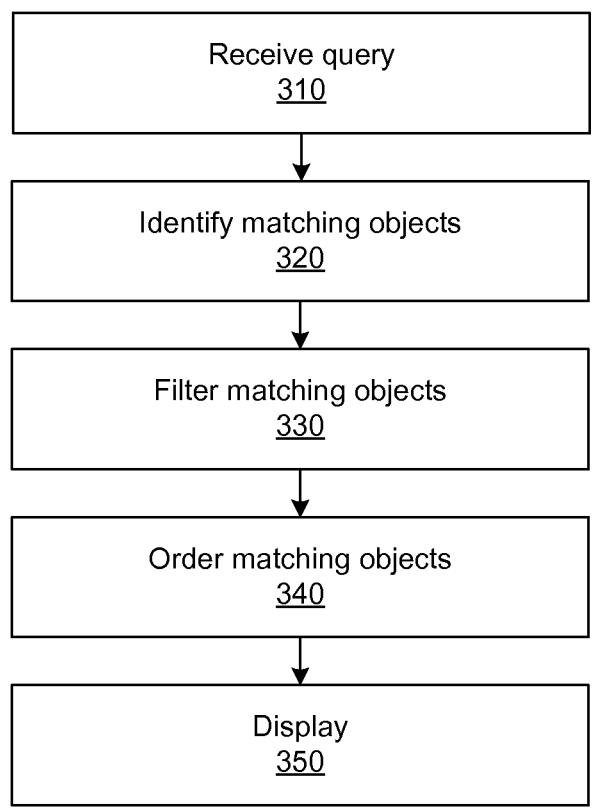
FIG. 3 is a flowchart of a process for obtaining and displaying objects in response to a search query, according to one embodiment.

FIG. 3 is a high-level flowchart of a process 300 for obtaining and displaying objects in response to a search query, according to one embodiment. Initially, a query is received 310 by the social networking system 100. In one embodiment, the query is received from a user interface of the social networking system 100 itself, such as within an implicit or explicit search interface illustrated in FIGS. 3A-3B. In another embodiment, the query is received from the third party website 190.

The social networking system 100 identifies 320 objects from the object store 110 that match the received textual query. More specifically, various result sets are received from the various search algorithms of the search sub-modules 141-143, as described above with respect to FIG. 1. These result sets are then aggregated (e.g., by the aggregation module 145) into a single combined result set, with duplicate objects being removed.

Each of the matching objects may further be filtered 330 based on an affinity measure of the searching user for the objects. In different embodiments, the affinity measure may comprise: a physical distance between a geographic location associated with the user with whom the query is associated and a geographic location associated with the object, a distance in a social graph between the object and a user object of the searching user, and a general similarity measure determined based on, for example, a user profile of the searching user, or past actions of the searching user within the social networking system 100. Other data may be used to measure affinity for matching objects.

The resulting objects are then ordered 340 and/or grouped. As one example, the objects can be grouped according to a source from which the objects came, such as from the result sets provided by the second order connections, history, or global importance search sub-modules 141-143. The objects can further be ordered 340 based on the affinity measure, and/or upon other factors, such as the source from which they came. Alternatively and/or additionally, the various search algorithms by which the objects are identified 320 may themselves perform filtering, ordering, and grouping operations.

Finally, the objects are displayed 350. In one embodiment, the objects are displayed in the user interface in which the query was entered, such as the user interfaces of the social networking system 100 depicted in FIGS. 3A-3B, or the user interface of the third party website 190 depicted in FIG. 2C.

Figure 4:
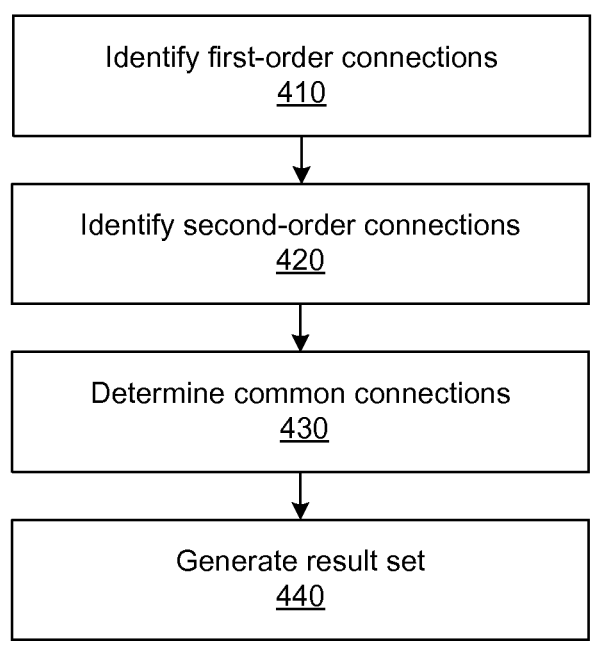
FIG. 4 is a flowchart of a process for obtaining second-order connections in response to a search query, according to one embodiment.

FIG. 4 is a flowchart of a process 400 for obtaining second-order connections in response to a search query, according to one embodiment. Specifically, this process explains in more detail the steps performed by the second-order connections search sub-module 141 when identifying matching objects during step 320 of FIG. 3. By this point, a textual query has already been received 310.

The process 400 identifies 410 the first-order connections of the searching user by referring to the connection index 121 of FIG. 1. The structure of the connection index 121 is now explained with respect to several examples tables thereof.

FIG. 5 illustrates example tables of the connection index 121 used to obtain first-order and second-order connections, according to one embodiment. Specifically, the example of FIG. 5 illustrates three tables 501, 502, and 503 corresponding to some set of user objects 111 for fictitious users named "Christian Konig," "David Eliot," and "Thomas Stearns Eliot," respectively. Each table contains data identifying the first-order connections of the user to whom the table corresponds. More specifically, each table comprises a set of name tokens, one name token for each distinct portion of the names of the users represented by the table. In one embodiment, the name tokens are sorted alphabetically to allow quick name lookups using a binary search algorithm. In one embodiment, a Bloom filter summarizing the name tokens is employed to provide a rapid determination of whether a given name is contained within the name table. Each table further comprises a set of unique user IDs, each user ID representing a distinct user, and each name token being associated with one of the user IDs. FIG. 5 illustrates integer user IDs, but any unique identifier may be used.

In the depicted example, the table 501—listing the users directly related to a user named "Christian Konig" and having a user ID of 0—contains the name token "Adams" in association with the user ID 1, the name token "Smith" in association with the user ID 5, and the name token "John" in association with user IDs 1 and 5. Thus, these three entries in the table 501 indicate that user "Christian Konig" has a direct relationship (e.g., a "friend" relationship) with users "John Adams" (user ID 1) and "John Smith" (user ID 5). Similarly, the second and tenth entries in table 502 together indicate that user "David Eliot" in turn has a direct connection with user "Christian Konig," and the $19^{th}$, $18^{th}$, and $4^{th}$ entries together indicate that "David Eliot" has a direct connection with "Thomas Stearns Eliot." Finally, the $5^{th}$ and $6^{th}$ entries in the table 503 indicate that "Thomas Stearns Eliot" likewise has a direct connection with "David Eliot."

Although the example tables of FIG. 5 only depict information used to identify connections representing user objects 111, it is appreciated that the connection index 121 supports identification of other types of objects, as well. For example, the connection index 121 may also contain tables containing entries corresponding to pages 115, such as name tokens of the pages and corresponding object identifiers of the pages. In different embodiments, separate object types may have separate sets of tables, or the <name token, ID> entries for different types of objects may be stored together within the same table.

Additionally, in one embodiment the connection index 121 includes, for each table, a version sorted by user ID rather than by name tokens, thus permitting rapid operations on the user IDs, such as intersections of user IDs to find common connections.

Referring again to FIG. 4, in order to identify 410 first-order connections of the searching user, the process 400 examines the table of the connection index 121 that corresponds to the searching user. The first-order connections are represented by the set of unique user IDs found within the table. For instance, in the example of FIG. 5 the first-order connections of user Christian Konig are the users corresponding to user IDs 1, 2, 3, 4, 5, 6, 7, and 16.

The process 400 then identifies the second-order connections of the searching user based on the first-order connections found in step 410. For instance, in the example of FIG. 5, the second-order connections of user Christian Konig are the first-order connections of each user identified as a first-order connection of Christian Konig. Thus, the second-order connections of Christian Konig include the first-order connections of user David Eliot (user ID 3)—i.e., the users with IDs 8, 9, 11, 12, 13, 14, and 15, the user ID 0 being excluded since it refers to the searching user himself.

The process 400 determines 430 the common connections of the searching user and each of the second-order connections. Referring again to the example of FIG. 5, searching user Christian Konig has 3 connections in common with second-order connection Thomas Stearns Eliot—namely, the users with IDs 1, 3, and 6. In one embodiment, the query processing module 140 stores a list of second-order connections of the searching user that have been identified, each entry in the list having a user identifier and an associated count value, and the list initially empty at the beginning of the query. The first time that a given second-order connection is identified, the corresponding user identifier (or object identifier, in the case of a non-user connection, such as a page) is added to the stored list and the associated count value is set to 1, to reflect that it has been identified once, through one first-order connection. Each additional time that the given second-order connection is identified—i.e., through a different first-order connection—the associated count value in the list is incremented to reflect another first-order connection in common between the searching user and the given second-order connection. In another one embodiment, the common connections between two users are determined by intersecting the user IDs of the users' respective tables.

The process 400 generates 440 the result set based on the identified connections. In one embodiment, the result set comprises the first-order and second-order connections identified in steps 410-420 and matching the query, e.g., having the query as a prefix of one of the name tokens of the connection. The second-order connections are also associated in the result set with the number of first-order connections that they have in common with the querying user, as determined in step 430. In one embodiment, the second-order connections are sorted according to the determined number of first-order connections that they have in common with the searching user and are ordered after the identified first-order connections in the result set. In one embodiment, second-order connections have fewer than some threshold number of first-order connections (e.g., 3) in common with the searching user are removed from the result set. The result set is then aggregated with the result sets of other search algorithms, e.g., by the aggregation module 145 of FIG. 1.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a first character of a query associated with a user of a social networking system in response to the user entering the first character into a text area displayed in a client device;
   obtaining a first result set comprising a plurality of objects from an object store of the social networking system that match the first character of the query;
   ordering at least a plurality of the objects of the first result set based at least in part on measures of affinities of the user for the objects, the measures of affinities of the user for the objects based at least in part on information about the user stored by the social networking system;
   providing at least a portion of the first result set to the client device;
   receiving a second character of the query in response to the user entering an the second character into the text area;
   obtaining a second result set of objects from the object store that match the first and second characters of the query; and
   providing at least a portion of the second result set to the client device.

2. The computer-implemented method of claim 1, wherein an affinity of the user for an object comprises at least one from a group consisting of: a distance on a social graph between the user and the object, and a similarity between the user and the object, the social graph having nodes corresponding to objects and edges corresponding to relationships of the objects.

3. The computer-implemented method of claim 1, further comprising obtaining a second result set of objects from the object store that match a concatenation of the first and second characters of the query.

4. The computer-implemented method of claim 1, wherein the second result set is a subset of the first result set.

5. The computer-implemented method of claim 1, wherein the first result set comprises a user object.

6. The computer-implemented method of claim 1, wherein the first result set comprises a page object.

7. The computer-implemented method of claim 1, wherein the first result set comprises at least one object selected from the group consisting of an application object, a group object, a media object, an event object, a location object, an inbox message, and a comment.

8. The computer-implemented method of claim 1, wherein the objects of the first result set are grouped within the first result set based at least in part on a search algorithm that produced them, the search algorithms including one or more of a second-order connections search, a history search, and a global importance search.

9. The computer-implemented method of claim 1, wherein the objects of the first result set are grouped within the first result set based at least in part on a search algorithm that produced them, the search algorithms including a global importance search.

10. The computer-implemented method of claim 1, wherein the plurality of objects includes a first object having a first type and obtained based on the first implicit query using a first search algorithm, and a second object having a second type different from the first type and obtained based on the first implicit query using a second search algorithm.

11. A non-transitory computer-readable storage medium comprising instructions executable by a computer processor, the instructions comprising:
   instructions for receiving a first character of a query associated with a user of a social networking system in response to the user entering the first character into a text area displayed in a client device;
   instructions for obtaining a first result set comprising a plurality of objects from an object store of the social networking system that match the first character of the query;
   instructions for ordering at least a plurality of the objects of the first result set based at least in part on measures of affinities of the user for the objects, the measures of affinities of the user for the objects based at least in part on information about the user stored by the social networking system;
   instructions for providing at least a portion of the first result set to the client device;
   instructions for receiving a second character of the query in response to the user entering an the second character into the text area;
   instructions for obtaining a second result set of objects from the object store that match the first and second characters of the query; and
   instructions for providing at least a portion of the second result set to the client device.

12. The non-transitory computer-readable storage medium of claim 11, wherein the objects of the first result set are grouped within the first result set based at least in part on a search algorithm that produced them, the search algorithms including one or more of a second-order connections search, a history search, and a global importance search.

13. The non-transitory computer-readable storage medium of claim 11, wherein the objects of the first result set are grouped within the first result set based at least in part on a search algorithm that produced them, the search algorithms including a global importance search.

14. The non-transitory computer-readable storage medium of claim 11, wherein the plurality of objects includes a first object having a first type and obtained based on the first implicit query using a first search algorithm, and a second object having a second type different from the first type and obtained based on the first implicit query using a second search algorithm.

15. A computer-implemented method comprising:
receiving, from a remote social networking system, a user interface comprising a text area;
displaying the user interface;
receiving a first character of a query from a user in response to the user entering the first character into the text area;
submitting the first character of the query to the remote social networking system;
receiving, from the remote social networking system, a first result set comprising objects matching the first character of the query, wherein at least a plurality of the objects of the first result set are ordered based at least in part on measures of affinities of the user for the objects, the measures of affinities of the user for the objects based at least in part on information about the user stored by the social networking system;
displaying a plurality of the objects of the first result set in visual association with the text area;
receiving a second character of the query from the user in response to the user entering an additional character into the text area;
receiving, from the remote social networking system, a second result set comprising objects matching the first and second characters of the query; and
displaying a plurality of the objects of the second result set in visual association with the text area.

16. The computer-implemented method of claim 15, wherein an affinity of the user for an object comprises at least one from a group consisting of: a distance on a social graph between the user and the object, and a similarity between the user and the object, the social graph having nodes corresponding to objects and edges corresponding to relationships of the objects.

17. The computer-implemented method of claim 15, further comprising using an application programming interface (API) of the remote social networking system to log the user in to the remote social networking system before submitting the first implicit query.

18. The computer-implemented method of claim 15, wherein the plurality of the objects is ordered based at least in part on physical distances between a geographic location associated with the user and geographic locations associated with the objects.

19. The computer-implemented method of claim 15, wherein the first result set comprises a user object.

20. The computer-implemented method of claim 15, wherein the first result set includes a first object having a first type and obtained based on the first implicit query using a first search algorithm, and a second object having a second type different from the first type and obtained based on the first implicit query using a second search algorithm.

* * * * *